(12) United States Patent
Lando

(10) Patent No.: US 7,931,366 B1
(45) Date of Patent: Apr. 26, 2011

(54) EXPANDABLE EYEWEAR WITH SNAP-TOGETHER BRIDGE

(76) Inventor: Ron Lando, Tiburon, CA (US)

( * ) Notice: Subject to any disclaimer, the term of this patent is extended or adjusted under 35 U.S.C. 154(b) by 0 days.

(21) Appl. No.: 12/629,297

(22) Filed: Dec. 2, 2009

(51) Int. Cl.
*G02C 3/00* (2006.01)

(52) U.S. Cl. .............................. 351/156; 351/124; 2/445

(58) Field of Classification Search .................. 351/111, 351/12, 124, 156, 157, 43, 158, 41; 2/445, 2/448, 454; 24/303
See application file for complete search history.

(56) References Cited

U.S. PATENT DOCUMENTS

| | | | |
|---|---|---|---|
| 1,819,738 A | 8/1931 | Daniels | 351/156 |
| 5,247,814 A | 9/1993 | McDonald | 63/3.2 |
| 5,956,117 A | 9/1999 | Suh et al. | 351/156 |
| 6,247,811 B1 | 6/2001 | Rhoades et al. | 351/156 |
| 6,253,388 B1 | 7/2001 | Lando | 2/445 |
| 2007/0070291 A1 | 3/2007 | Su | |
| 2007/0268449 A1 | 11/2007 | Skuro | |
| 2008/0086796 A1 | 4/2008 | Lindahl | |

*Primary Examiner* — Hung X Dang
(74) *Attorney, Agent, or Firm* — Bay Area Technology Law Group PC

(57) ABSTRACT

The present eyewear includes a pair of lenses, a pair of releaseable connectors connected to respective inner ends of the lenses, a pair of temples pivotally connected to respective outer ends of the lenses and a rigid strap connected between rear ends of the temples. The strap is generally U-shaped having substantially parallel legs connected to an arc-shaped base, the substantially parallel legs being connected to rear ends of the temples and when worn, the arc-shaped base extends along the back of a user's head. The strap at its U-shaped base is provided with a telescoping segment for selectively altering the length of the arc-shaped base for altering the spacing between the strap's substantially parallel legs to adjust the strap for varying widths of a user's head. The inner ends of the lenses are releasably secured together by connectors. In use, the lenses are separated from each other and pivoted outwardly, the strap wrapped around the back of a user's head and adjusted for size The lenses are then pivoted towards each other and secured together in front of the user's eyes. The lenses are instantly separable for easily putting on or taking off the eyewear, but they are instantly connectable together for a secure and accurate fit.

10 Claims, 2 Drawing Sheets

EXPANDABLE EYEWEAR WITH SNAP-TOGETHER BRIDGE

TECHNICAL FIELD

The present invention deals with improved eyewear having a snap-together bridge feature.

BACKGROUND OF THE INVENTION

Applicant is the owner of U.S. Pat. No. 6,253,388. The invention disclosed and claimed in the '388 patent involved eyewear comprised of a pair of lenses, releaseable connectors connected to respective inner ends of the lenses, a pair of temples pivotable to respective outer ends of the lenses and a rigid strap attached between rear ends of the temples. The strap was taught to be positioned below the lenses so as not to interference with a hairdo or helmet. The inner ends of the lenses were taught to be releasably secured together by the connectors, preferably, magnets. To position the eyewear, the lenses are first separated from each other and pivoted outwardly. The strap is then wrapped around the back of a user's head and the lenses pivoted towards each other and secured together in front of the eyes. The lenses were taught to be instantly separable for easily putting on and taking off the eyewear, but they are instantly connectable for a secure and accurate fit.

FIG. 1 depicts the eyewear generally disclosed and claimed in applicant's '388 patent. Specifically, lenses 10 were shown to be preferably mounted in respective frames 14 which are pivoted to temples 12. Connectors 11 are attached to respective inner ends of frames 14. Temples 12 are preferably telescoping for fitting different wearers. As noted, temples 12 were taught to be pivoted to the respective outer ends of frames 14 and include hook portion 16 for hooking around a user's ears. Strap 13 was taught to be positioned below lenses 10 so as to avoid interfering with a hairdo or helmet and preferably springy enough to retain its shape when released, but also flexible enough to be bendable to some extent without breaking. Alternatively, strap 13 was taught to be at the same level as temples 12, but at a loss of some advantages. The disclosure of U.S. Pat. No. 6,253,388 is incorporated herein by reference.

FIG. 2 depicts as oval 50, the head of a user from a perspective above the user facing straight down thereupon. The major axes of user's head 50 are shown from front to back as 21 and side to side as 22. The '388 patent taught, as a preferred embodiment, the ability to alter the length of the strap/temple pieces in the event the user's head along axis 21 was particularly large to minimize the inadvertent separation of the lenses by disengagement of connectors 11. It was found that if a user had a particularly elongated head along axis 21, normal use of the eyewear could result in lenses 10 separating from one another by inadvertent detachment of connectors 11 which would discourage continued use of such eyewear. However, the former eyewear disclosed by applicant had no way to accommodate users whose heads were particularly wide thus having a dimension along axis 22 which is of considerable proportion.

It is thus an object of the present invention to provide eyewear with a snap connector bridge capable of adjustment along both major axes of a user's head to thus provide such eyewear to a greater segment of the using public.

These and further objects will be more readily apparent when considering the following disclosure and appended claims.

SUMMARY OF THE INVENTION

The present eyewear includes a pair of lenses, a pair of releaseable connectors connected to respective inner ends of the lenses, a pair of temples pivotally connected to respective outer ends of the lenses and a rigid strap connected between rear ends of the temples. The strap is generally U-shaped having substantially parallel legs connected to an arc-shaped base, the substantially parallel legs being connected to rear ends of the temples and when worn, the arc-shaped base extends along the back of a user's head. The strap at its U-shaped base is provided with a telescoping segment for selectively altering the length of the arc-shaped base for altering the spacing between the strap's substantially parallel legs to adjust the strap for varying widths of a user's head. The inner ends of the lenses are releasably secured together by connectors. In use, the lenses are separated from each other and pivoted outwardly, the strap wrapped around the back of a user's head and adjusted for size. The lenses are then pivoted towards each other and secured together in front of the user's eyes. The lenses are instantly separable for easily putting on or taking off the eyewear, but they are instantly connectable together for a secure and accurate fit.

DETAILED DESCRIPTION OF THE INVENTION

Figure 1:
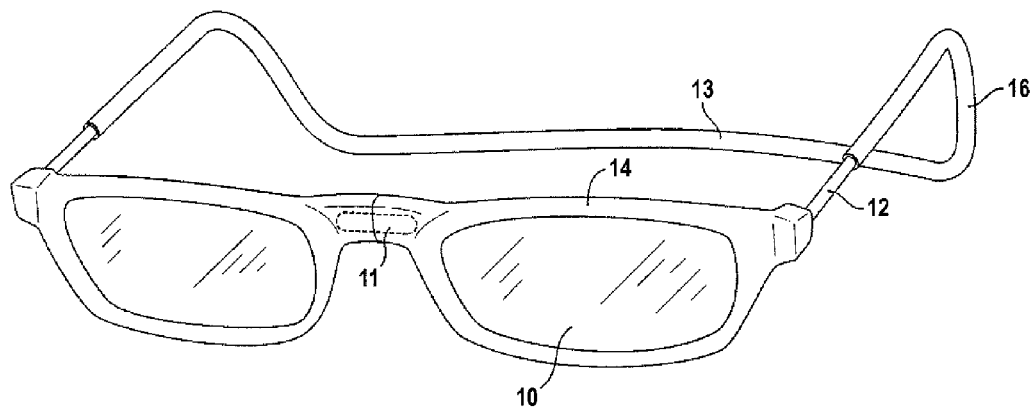
FIG. 1 is a perspective view of eyewear made the subject of U.S. Pat. No. 6,253,388

Novel features which are characteristic of the invention, as to organization and method of operation, together with the further objects and advantages thereof will be better understood from the following description considered in conjunction with the accompanying drawings, in which preferred embodiments in the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined the more important features of the invention in the summary above in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Certain terminology and derivations thereof may be used in the following description for convenience and reference only, and will not be limiting. For example, words such as "upward", "downward", "left" and "right" refer to directions in the drawings to which reference is made unless otherwise stated. Similarly, words such as "inward" and "outward" refer to directions toward and away from, respectively, the geometric center of the device or area and designated parts thereof. Reference in the singular sense include the plural and vice-versa, unless otherwise stated.

As noted previously, applicant has taught in its U.S. Pat. No. 6,253,388, eyewear which includes lenses 10 mounted in respective frames 14. Connectors 11 are preferably attached to inner ends of frames 14. Temples 12 are preferably telescopic for fitting different wearers. As to this later feature, it is noted that telescoping temples 12 assist a wearer whose head, along axis 21 is larger than normal. Without this telescoping feature, an attempt to wear applicant's eyewear with snap-together bridge could, and oftentimes does, inadvertently lose connectivity at the bridge resulting in the lenses separating at 32 as shown schematically in FIG. 4A. However, despite the telescoping feature described above, if a person's head is somewhat larger than average along axis 22, inadvertent release of connectors 32 cannot be avoided.

Figure 3:
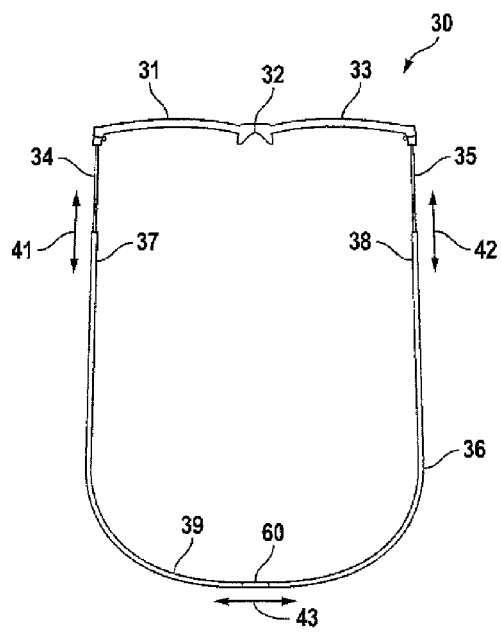
FIG. 3 is a top plan view of the eyewear of the present invention.

In turning to FIG. 3, eyewear 30 is depicted in a downwardly facing elevational view. Shown are lenses 31 and 33 releasably from one another at their inner ends through the use of connectors 32, preferably, a pair of magnets embedded within frames surrounding each of said lenses 31 and 33. Temple pieces 34 and 35 pivotally extend from the lenses or their frames 31 and 33, respectively and are connected to generally U-shaped strap 36, the strap being rigid enough to generally retain its shape when connectors 32 are released and is springy enough to be bendable when flexed and rebound when released.

Figure 2:
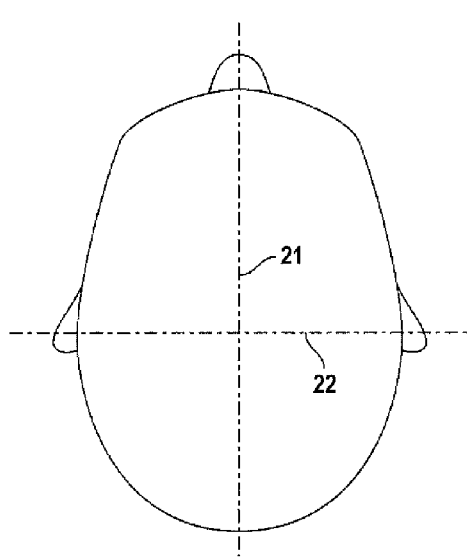
FIG. 2 is a top plan view of the head of a typical user of the present invention.

As noted by arrows 41 and 42 in FIG. 3, temple pieces 34 and 35 can telescope with regard to parallel legs 37 and 38 of U-shaped strap 36 thus extending or contracting the distance between lenses 31 and 33 and the arc-shaped base 39 of eyewear 30 along axis 21 (FIG. 2).

Figure 4A:
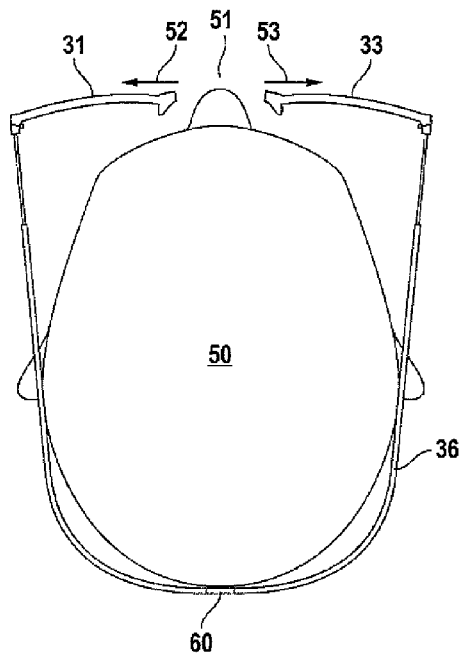
FIGS. 4A and 4B are top plan views of a user's head supporting the eyewear of the present invention.

Even with this telescoping feature, it is very common for lenses 31 and 33 to separate as depicted in FIG. 4A particularly if head 50 is unusually wide along axis 22 (FIG. 2). To account for this contingency, strap 36 is provided with telescoping segment 60, the details of which will be described hereinafter.

Figure 4B:
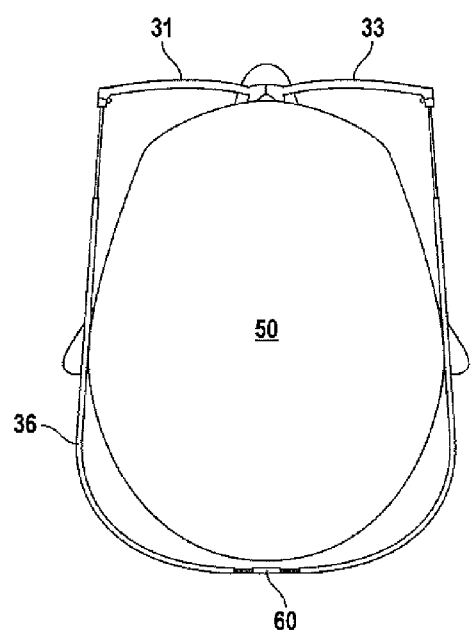
Figure 5:
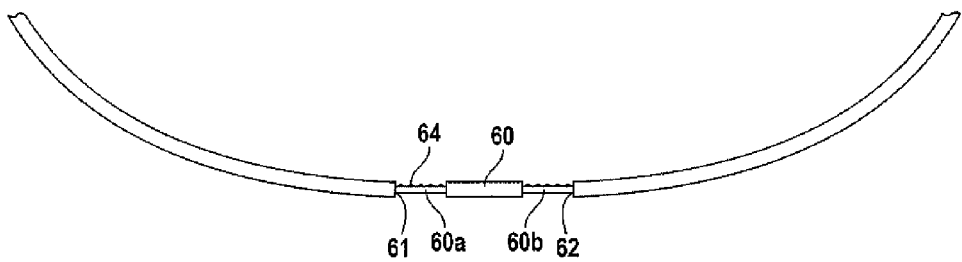
FIG. 5 is a top plan view of the present invention depicting a portion of the inventive eyewear highlighting its improvement over the prior art.

In wearing eyewear 30, the inner ends of lenses 31 and 33 are pivoted with respect to temples 34 and 35 so that they extend outwardly and substantially as extensions to temples 34 and 35 as U-shaped strap 36 is placed around head 50 of a user. Thereupon, lenses 31 and 33 are pivoted with respect to temples 34 and 35 until connectors 32 releasably attach the lenses to one another as more fully described in the '388 patent. However, if head 50 of the user is particularly wide (along axis 22 of FIG. 2), lenses 31 and 33 can separate at opening 51 making the present eyewear impractical. When this is experienced, ends 61 and 62 of strap 36 at arc-shaped base 39 can be separated from one another in the direction of arrows 43 (FIG. 3). Ideally, bridge 60 having extension pieces 60a and 60b telescope within strap 36, its position being held through friction or through the use of protrusions 64. Thus, as ends 61 and 62 of substantially arc-shaped base 39 of strap 36 pull apart and away from one another, eyewear 30 shown in FIG. 4A is transformed into eyewear 30 of FIG. 4B enabling the eyewear to ideally fit about head 50 of the user thus preventing the inadvertent disengagement of connectors 32 from occurring.

The above disclosure is sufficient to enable one of ordinary skill in the art to practice the invention, and provides the best of mode of practicing the invention presently contemplated by the inventor. While there is provided herein a full and complete disclosure of the preferred embodiments of the invention, it is not desired to limit the invention to the exact construction, dimensions, relationships or operations as described. Various modifications, alternative constructions, changes and equivalents will readily occur to those skilled in the art and may be employed as suitable, without departing from the true spirit and scope of the invention. Such changes might involve alternative materials, components, structural arrangements, sizes, shapes, forms, functions, operational features or the like.

Therefore, the above description and illustration should not be construed as limiting the scope of the invention, which is defined by the appended claims.

What is claimed is:

1. Eyewear, comprising:
   a pair of lenses;
   a pair of releaseable connectors connected to respective inner ends of said lenses, said connectors being securely connectable together and releaseable from each other;
   a pair of temples connected to respective outer ends of said lenses; and
   a strap connected between rear ends of said temples, said strap being rigid enough to generally retain its shape when said connectors are released, and springy enough to be bendable when flexed and rebounding when released, said strap being generally U-shaped having substantially parallel legs connected to an arc-shaped base, said substantially parallel legs being connected to rear ends of said temples and when worn, said arc-shaped base extending along the back of a user's head, and further comprising a telescoping segment located within said arc-shaped base for selectively altering the length of said arc-shaped base for altering the spacing between said substantially parallel legs to adjust said strap for varying widths of a user's head; and
   wherein said connectors are released so that said eyewear is easy to put on and remove, and when said connectors are connected together, said lenses are secured in position relative to each other for secure and stable positioning in front of a pair of eyes.

2. The eyewear of claim 1 wherein said connectors are comprised of magnets.

3. The eyewear of claim 1 wherein said temples are comprised of telescopic temples for fitting different wearers.

4. The eyewear of claim 1, wherein said temples are pivotally connected to said lenses, so that when said connectors are released from each other, said inner ends of said lenses are pivotable outwardly from making wearing easier.

5. The eyewear of claim 1 further including a pair of frames, said lenses being respectively mounted in said frames, said connectors being attached to respective inner ends of said frames, said temples being attached to respective outer ends of said frames.

6. Eyewear, comprising:
   a pair of lenses;
   a pair of releaseable connectors connected to respective inner ends of said lenses, said connectors being securely connectable together and releaseable from each other;
   a pair of temples connected to respective outer ends of said lenses, said ends of said temples being hooked downward for wrapping around a pair of ears;
   a strap being generally U-shaped having substantially parallel legs connected to an arc-shaped base, said substantially parallel legs being connected to tear ends of said temples and when worn, said arc-shaped base extending along the back of a user's head, and further comprising a telescoping segment located within said arc-shaped base for selectively altering the length of said arc-shaped base for altering the spacing between said substantially parallel legs to adjust said strap for bearing widths of user's head; and wherein when said connectors are released from each other, said inner ends of said lenses are separable from each other so that said eyewear is easy to put on and remove, and when said connectors are connected together, said lenses are secured in position relative to each other for secure and stable positioning in front of a pair of eyes.

7. The eyewear of claim 6, wherein said connectors are comprised of magnets.

8. The eyewear of claim 6 wherein said temples are comprised of telescopic temples for fitting different wearers.

9. The eyewear of claim 6, wherein said temples are pivotally connected to said lenses, so that when said connectors are released from each other, said inner ends of said lenses are pivotable outwardly for making wearing easier.

10. The eyewear of claim 6 further including a pair of frames, said lenses being respectively mounted in said frames, said connectors being attached to respective inner ends of said frames, said temples being attached to respective outer ends of said frames.

* * * * *